United States Patent
Marti

(10) Patent No.: US 8,122,155 B1
(45) Date of Patent: Feb. 21, 2012

(54) RDMA WRITE COMPLETION SEMANTICS

(75) Inventor: Felix A. Marti, San Francisco, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 225 days.

(21) Appl. No.: 12/490,242

(22) Filed: Jun. 23, 2009

(51) Int. Cl.
*G06F 15/16* (2006.01)

(52) U.S. Cl. ............ 709/250; 709/212; 709/213; 707/2; 707/10; 710/22; 370/395.7

(58) Field of Classification Search .................. 709/212, 709/216, 217, 213, 230; 710/22, 308, 315; 707/2, 10, 999.01, 999.001; 470/466; 370/395.7
See application file for complete search history.

(56) References Cited

U.S. PATENT DOCUMENTS

| | | | |
|---|---|---|---|
| 6,831,916 B1 * | 12/2004 | Parthasarathy et al. ....... | 370/359 |
| 7,281,030 B1 * | 10/2007 | Davis ............................. | 709/212 |
| 7,526,574 B2 * | 4/2009 | Hufferd et al. ................ | 709/246 |
| 7,536,462 B2 * | 5/2009 | Pandya .......................... | 709/227 |
| 7,620,057 B1 * | 11/2009 | Aloni et al. ................. | 370/395.7 |
| 7,840,765 B2 * | 11/2010 | VelurEunni .................... | 711/156 |
| 8,032,686 B2 * | 10/2011 | O'Brien et al. .............. | 710/315 |
| 2002/0071450 A1 * | 6/2002 | Gasbarro et al. .............. | 370/463 |
| 2003/0009432 A1 * | 1/2003 | Sugahara et al. ................ | 707/1 |
| 2004/0073622 A1 * | 4/2004 | McDaniel et al. ............. | 709/212 |
| 2005/0149623 A1 * | 7/2005 | Biran et al. .................... | 709/212 |
| 2006/0256784 A1 * | 11/2006 | Feng et al. .................... | 370/381 |
| 2010/0281201 A1 * | 11/2010 | O'Brien et al. ............... | 710/308 |

OTHER PUBLICATIONS

"RDMA Protocol Verbs Specification (Version 1.0)," Apr. 2003, http://www.rdmaconsortium.org/home/draft-hilland-iwarp-verbs-v1.0-RDMAC.pdf, Downloaded on Jun. 23, 2009.
"An RDMA Protocol Specification," Oct. 2007, http://tools.ietf.org/html/rfc5040,Downloaded on Jun. 23, 2009.

\* cited by examiner

*Primary Examiner* — Frantz Jean
(74) *Attorney, Agent, or Firm* — Beyer Law Group LLP

(57) ABSTRACT

An RDMA Network Interface Controller (NIC) is operated to accomplish an RDMA WRITE operation initiated by an application operating on a host computing device to which the RDMA NIC is coupled for RDMA communication over a network with a peer device. The RDMA NIC receives an RDMA WRITE request from the host device, for writing data from a memory associated with the host device to a memory associated with the peer device using an RDMA protocol. The RDMA NIC initiates an RDMA WRITE operation from the memory associated with the host device to the memory associated with the peer device. Furthermore, the RDMA NIC automatically generates a completion indication for the RDMA WRITE operation to the host computing device by performing an RDMA READ operation and converting a READ COMPLETION for the RDMA READ operation to the completion indication for the RDMA WRITE operation.

10 Claims, 2 Drawing Sheets

RDMA WRITE COMPLETION SEMANTICS

BACKGROUND

The present application is in the field of Remote Direct Memory Access (RDMA) and, in particular, relates to RDMA WRITE completion indications.

Remote Direct Memory Access (RDMA) is a protocol via which data can be moved directly from the memory of a first computing device to the memory of another computing device, coupled to the first computing device via a network, generally without involvement of either the operating system of the first computing device or the operating system of the second computing device. More generically, this is known as "kernel bypass." This permits high-throughput and low-latency networking.

RDMA provides a channel interface to an application running on the first computing device, traditionally providing the following three RDMA data transfer mechanisms:

RDMA WRITE
RDMA READ
Sequenced reliable datagram (Send)

For example, considering the first computing device to be "Station A" and the second computing device to be "Station B," an RDMA WRITE data transfer operates to transfer data directly from a source buffer of Station A to a sink buffer of Station B. In particular, an application on Station A may post a write work request (WR) into a send work request queue, and Station A then notifies a RDMA Network Interface Controller (RDMA NIC) attached to Station A, such as by a doorbell mechanism, that a work request is available in the Send Work Request queue (SQ) to be processed. The RDMA NIC fetches the work request that specifies that an RDMA WRITE operation to Station B is to be performed for the payload pointed to by the SQ WR. The RDMA NIC subsequently performs one or more DMA read operations, encapsulates the data within headers appropriate for communication over the network (e.g. Ethernet/TCP/IP packet(s)) and sends the encapsulated data (e.g., Ethernet frame) over the network to station B.

According to various RDMA protocols, when the RDMA WR operation has completed, a completion queue entry CQE is placed in the WC (Work Request Completion Queue) of the station that posted the RDMA WR. That is, the consumer (which in general is an application or a upper layer protocol (ULP)) can request that a completion is generated. Generally, an implementation generates a completion from the hardware into the completion queue. However, the device driver/library will only indicate completion for operations for which a completion request has been made or that have an implicit completion (such as RDMA READs).

While the above general discussion is correct for various different RDMA protocols, such as IETF RDDP and Infiniband, particular protocol specifications dictate different particular completion semantics. Referring still to the example of the RDMA WRITE data transfer to transfer data directly from a source buffer of Station A to a sink buffer of Station B, the CQE can be created, for example, when:

the last byte of the data src reaches the RDMA NIC associated with Station A (this is the IETF RDDP specification for RDMA NIC semantics); or
the last byte of the data src reaches the RDMA NIC associated with Station B (this is the Infiniband specification for RDMA NIC semantics); or
the last byte of the data reaches the sink memory of Station B.

Other options are possible as well.

Thus, for example, with respect to IETF RDDP completion semantics, an RDMA WRITE completes at the source, Station A, as soon as the source buffer has been DMA read and the RDMA NIC does not need to access the source buffer anymore. The Upper Layer Protocol (ULP)/Application is free to reuse the buffer (and potentially change the buffer) as soon as the RDMA WRITE has been completed. If there is a transport error that prevents the source data from being delivered from the source RDMA NIC Station A to the sink RDMA NIC Station B, then the source RDMA NIC raises an asynchronous error to inform the ULP/Application about the failure, and places an indication of the event in the asynchronous error queue AE. As another example, the RDMA NIC on station A could also fail without station A failing and, in that case, there will not be any AE, and it thus would not be known in general if the data reached station B.

SUMMARY

In accordance with aspects of the invention, even RDMA WRITE completion semantics not supported by a particular RDMA protocol may be supported using generally available RDMA operations, such as RDMA READ. Furthermore, by handling these RDMA WRITE completion semantics in an RDMA NIC using generally available RDMA operations, additional resource requirements on the source, additional transactions on the system interconnect and additional I/O can be minimized or avoided.

In accordance with one aspect of the invention, an RDMA Network Interface Controller (NIC) is operated to accomplish an RDMA WRITE operation initiated by an application operating on a host computing device to which the RDMA NIC is coupled for RDMA communication over a network with a peer device. The RDMA NIC receives an RDMA WRITE request from the host device, for writing data from a memory associated with the host device to a memory associated with the peer device using an RDMA protocol, wherein the RDMA WRITE request received from the RDMA NIC includes a corresponding WRITE completion semantics indication. The RDMA NIC initiates an RDMA WRITE operation from the memory associated with the host device to the memory associated with the peer device. Furthermore, the RDMA NIC automatically generates a completion indication for the RDMA WRITE operation to the host computing device by performing an RDMA READ operation and converting a READ COMPLETION for the RDMA READ operation to the completion indication for the RDMA WRITE operation.

In accordance with another aspect of the invention, an RDMA Network Interface Controller (NIC) is operated to accomplish an RDMA WRITE operation initiated by an application operating on a host computing device to which the RDMA NIC is coupled for RDMA communication over a network with a peer device. The RDMA NIC receives an RDMA WRITE request, for writing data from a memory associated with the host device to a memory associated with the peer device using an RDMA protocol. The RDMA NIC, initiating an RDMA WRITE operation from the memory associated with the host device to the memory associated with the peer device. Furthermore, the RDMA NIC performing a generally available RDMA operation (such as an RDMA READ) in addition to the RDMA WRITE operation and generates a completion indication for the RDMA WRITE operation to the host computing device based on a completion indication for the generally available RDMA operation.

In accordance with another aspect of the invention, an RDMA Network Interface Controller (NIC) is operated to accomplish an RDMA WRITE operation initiated by an application operating on a host computing device to which the RDMA NIC is coupled for RDMA communication over a network with a peer device. The RDMA NIC receives an RDMA WRITE request from the host device, for writing data from a memory associated with the host device to a memory associated with the peer device using an RDMA protocol. The RDMA NIC initiates an RDMA WRITE operation from the memory associated with the host device to the memory associated with the peer device. Furthermore, the RDMA NIC automatically generates a completion indication for the RDMA WRITE operation to the host computing device by performing an RDMA READ operation and converting a READ COMPLETION for the RDMA READ operation to the completion indication for the RDMA WRITE operation.

DETAILED DESCRIPTION

The background discusses various different completion semantics for RDMA WRITE operations:

IETF RDDP completion semantics. Complete as soon as source buffer is available again. This is referred to herein as "source semantics";

Infiniband Completion Semantics. Complete as soon as the data has reached the peer RDMA-capable network device—the peer RDMA NIC—for example, based on the TCP ACK for the last byte of the data src reaching the sink station from the source station. This is referred to herein as "remote system delivery semantics."

Complete as soon as the data has been written into the system interconnect of the sink system (e.g., the PCI-E link). This is referred to herein as "remote system interconnect semantics."

Complete as soon as the data has been written into the sink memory of the sink station. This is referred to herein as "remote system placement semantics."

Figure 1:
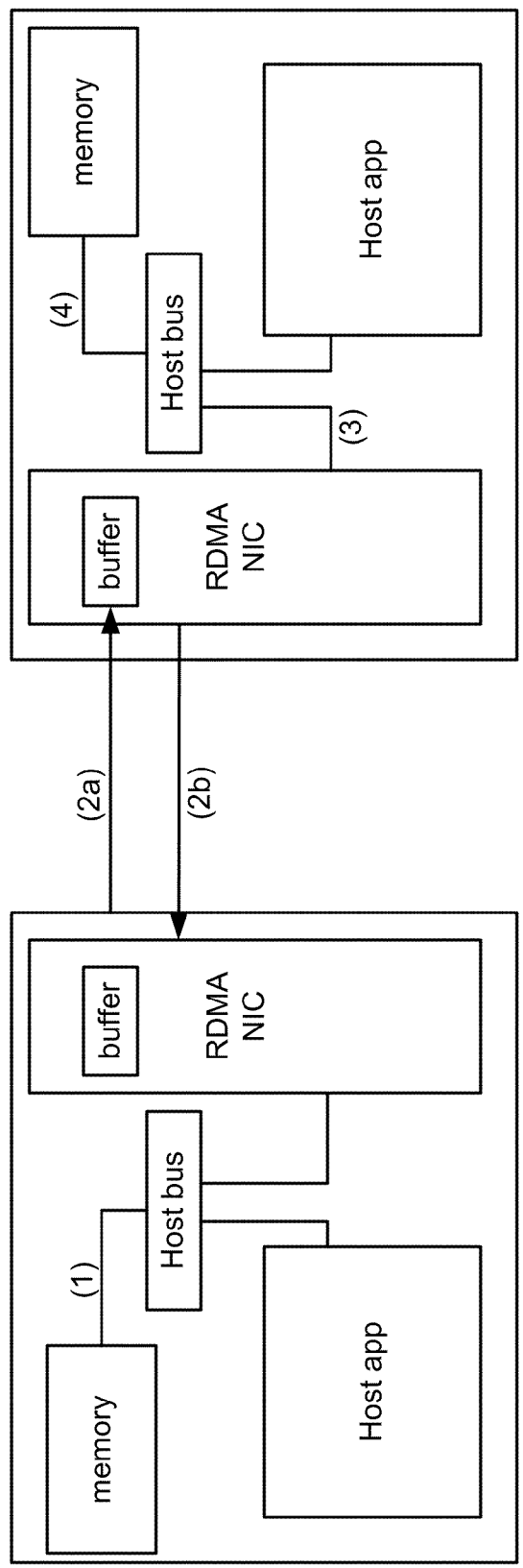
FIG. 1 is a simplified block diagram that illustrates various RDMA completion semantics.

FIG. 1 is a simplified block diagram that illustrates the various completion semantics listed above. The item (1) represents the data of the RDMA WRITE operation having been read by the Station A RDMA NIC (e.g., by DMA) from the Station A source memory, such that the source buffer is available again. A completion indication at this point would represent source semantics. The item (2a) represents the data reaching the Station B RDMA NIC from the Station A RDMA NIC, the receipt of which is acknowledged (2b) by the Station B RDMA NIC to the Station A RDMA NIC. The item (3) represents the data reaching the Station B system interconnect. Finally, the item (4) represents the data reaching the Station B sink memory.

The above completion semantics list is ordered by distance from the RDMA WRITE source. Thus, as the list progresses, the longer it takes for a completion to be generated, but the probability of the data not reaching the remote system sink buffer decreases. Therefore, there is a tradeoff between e.g. completion latency and guarantees the likelihood of the data to make it to the sink buffer.

Different applications have different demands, typically based on what is a perceived requirement for that application. For example, some applications only demand source semantics; others demand placement semantics. For example, it is generally important to guarantee the delivery of data all the way to the remote system sink buffer when data is being backed up via the RDMA WRITE operation, in which case the placement semantics can guarantee that the backup entry has been created. In accordance with an aspect of the invention, even in situations in which a particular RDMA protocol does not provide itself provide for adequate completion semantics for a particular application, a more generally available RDMA operation may be utilized to achieve a particular selected demanded and/or required level of completion semantics.

From a ULP/Application point of view, providing the completion semantic in this manner would require extra host resources at the source to handle: for example, an extra send queue and completion queue slot per RDMA WRITE, relative to the more generally available RDMA operation used to achieve the completion semantic. In addition, the generally available RDMA operation results in extra transactions on the local system interconnect as well as additional I/O to be processed by the source RDMA NIC.

Thus, in accordance with other examples, though the application can request a particular level of completion semantics (e.g., via an API associated with the RDMA WRITE), the implementation of the completion semantics can be hidden from the application, such as by driver software executing by a host to drive operations of the RDMA NIC or is implemented on the RDMA NIC itself. In some configurations, a particular level of completion semantics may be provided for one or more applications, implemented using the generally available RDMA operations, without the applications explicitly requesting that level of completion semantics.

An RDMA READ WR is an example of a generally available RDMA operation that may be utilized to achieve a particular level of completion semantics for an RDMA WRITE operation, even if that particular level of completion semantics is not explicitly provided by the particular RDMA protocol. For example, an RDMA READ WR may be used as follows to accomplish completion semantics:

Delivery semantics and Remote Station Interconnect semantics: a 0-byte RDMA READ completion behind a RDMA WRITE guarantees that the RDMA WRITE made it to the sink RDMA-capable network device and the data has been delivered to the system interconnect of the sink RDMA-capable network device;

Remote Station Placement semantics: a 1-byte RDMA READ completion behind a RDMA WRITE guarantees that the RDMA WRITE made it into the data sink buffer For example, following an RDMA WRITE OPERATION with Station A as a source station and Station B as a remote station, an RDMA READ WR may be issued by Station A, specifying a read destination buffer in Station A and a read source buffer in Station B. The RDMA READ WR is transported (such as Ethernet packets) from Station A to Station B. Station B subsequently issues DMA read(s) for the read source buffer and the Station B RDMA NIC encapsulates this payload (e.g., again, within TCP/IP packets in Ethernet frames) and provides the encapsulated data back to Station A, which DMA writes the payload directly to the read destination buffer.

An RDMA READ WR that is issued on station A after an RDMA WRITE WR to the same buffer on station B is guaranteed to read the data written by the RDMA WRITE WR, i.e. the WRITE and subsequent READ are end-to-end ordered. For example, this is a requirement of the RDMA Protocol Specification, entitled "An RDMA Protocol Specification" and dated October 2007, and available at http://tools.ietf.org/ html/rfc5040 (see, in particular, Section 5.5). See, also, "RDMA Protocol Verbs Specification (Version 1.0)" dated April 2003, and available at http://www.rdmaconsortium.org/home/draft-hilland-iwarp-verbs-v1.0-RDMAC.pdf (see, in particular, page 144, in the section entitled "Implementation of an end-to-end fence using an RDMA WRITE WR followed by an RDMA READ Type WR"). Thus, for example, in the absence of adequate completion semantics provided by the RDMA fabric, the application may use an RDMA WRITE followed by an RDMA READ to achieve the required semantics.

Furthermore, in accordance with an aspect, the RDMA WRITE Operation instruction is enhanced (such as by enhancing the API) with an explicit completion semantics indication, such as Source semantics Delivery and Remote System Interconnect semantics (It is noted that, in accordance with the described embodiment(s), Delivery and Remote System Interconnect semantics are merged. This is because, presently, there is no RDMA OP that allows for distinction between the two. It should be kept in mind that a transport layer ack, if present, can be used to implement Delivery semantics only. At least in the case of TCP, the implementation can be complex and, in practice, users may not require or desire this level of distinction.)

Remote System Placement semantics

Thus, for example, the RDMA WRITE issued from the ULP/Application may be issued as a single Write Request to the RDMA NIC and also indicating a selected completion semantic corresponding to the RDMA WRITE. The indication of the selected completion semantic may be an explicit indication or may be implicit. The source system RDMA NIC processes the indicated completion semantic and implements the selection using generally available RDMA operations to accomplish the selected completion semantics. In one example, in the case of the selection indicating source semantics, the RDMA NIC completes the RDMA WRITE based on the source buffer having been DMA read, such that the source buffer can be reused by the ULP/Application. In case of Remote System Delivery and Interconnect semantics, the RDMA NIC does not generate a completion explicitly for the RDMA WRITE, but issues a 0-byte RDMA READ behind the RDMA WRITE. The RDMA READ completion then serves as implicit RDMA WRITE completion. In case of Remote System placement completion semantics, the RDMA NIC does not generate a completion explicitly for the RDMA WRITE, but issues a >0-byte RDMA READ behind the RDMA WRITE. Again, the RDMA READ completion then serves as implicit RDMA WRITE completion.

As a specific example, if the remote station system interconnect is PCI, then the completion of a 0-byte RDMA READ behind a RDMA READ guarantees that the previous write has made it through the PCI bridge. Unless there is a hierarchy of bridges, that means that a 0-byte RDMA READ is sufficient to guarantee that the previous write is visible by the remote ulp/application. It may appear, at first glance, that Delivery and Remote System Interconnect semantics are the same as Placement semantics. However, there is a slight difference. With Delivery and Remote System Interconnect semantics, the written data may sit in the Remote System somewhere in the chipset and, while visible to the ULP/application, the data may not be in memory yet. Considering the example of data backup, it is then quite conceivable that the backed up date must sit in memory to be a true backup, in order to sustain the loss of power in the backup machine (assuming that the memory is non-volatile).

Here, it is helpful to touch on implications of 0-byte RDMA READ versus a one byte RDMA READ. Generally, for all systems, a 1-byte RDMA READ will go to the coherent memory domain thereby guaranteeing that a preceding RDMA WRITE has completed, i.e. has executed on the coherent memory and, for example, is therefore protected by the high-availability for that memory. For some systems a 0-byte RDMA READ will only guarantee that the RDMA WRITE data has crossed the interconnect on Station B For some systems, such as specifically those with DMA WRITE with acknowledge commands (the SGI Origin systems have this feature, and no doubt others too), the 0-byte RDMA READ can be transformed into a DMA WRITE with acknowledge for the RDMA WRITE, and this guarantees execution on the coherent memory for the RDMA WRITE when the 0-byte RDMA READ completes.

The mapping from the traditional RDMA WRITE to the RDMA WRITE with explicit completion semantics may be exposed to the ULP/Application or may be done "under the covers" by the network device system software (that is, for example, the driver software or library via which the host interacts with the RDMA NIC). The latter may be particularly interesting when moving applications from one fabric to another; e.g. moving an InfiniBand application to IETF RDDP. This may be significant because, for example, Linux provides an RDMA API to applications and it is perceived that any application written to that API runs on any RDMA provider that plugs into that framework. Today, there are generally two type of providers: IB and RDDP. However, there are subtleties between these providers that generally should not be ignored, for example, the RDMA WRITE completion semantics difference. In accordance with some described examples, then, it may be considered that a "global switch" is provided such that the RDMA provider looks like an IB network and, hence, applications that were originally written specifically to use IB will "just work" on the RDDP protocol as well. As a result, portability of existing IB applications to RDMA NIC can be ensured without requiring costly testing and quality assurance activity.

In accordance with the description above, even RDMA WRITE completion semantics not supported by a particular RDMA protocol may be supported using generally available RDMA operations, such as RDMA READ. Furthermore, by handling these RDMA WRITE completion semantics in an RDMA NIC using generally available RDMA operations, additional resource requirements on the source, additional transactions on the system interconnect and additional I/O can be minimized or avoided.

Figure 2:
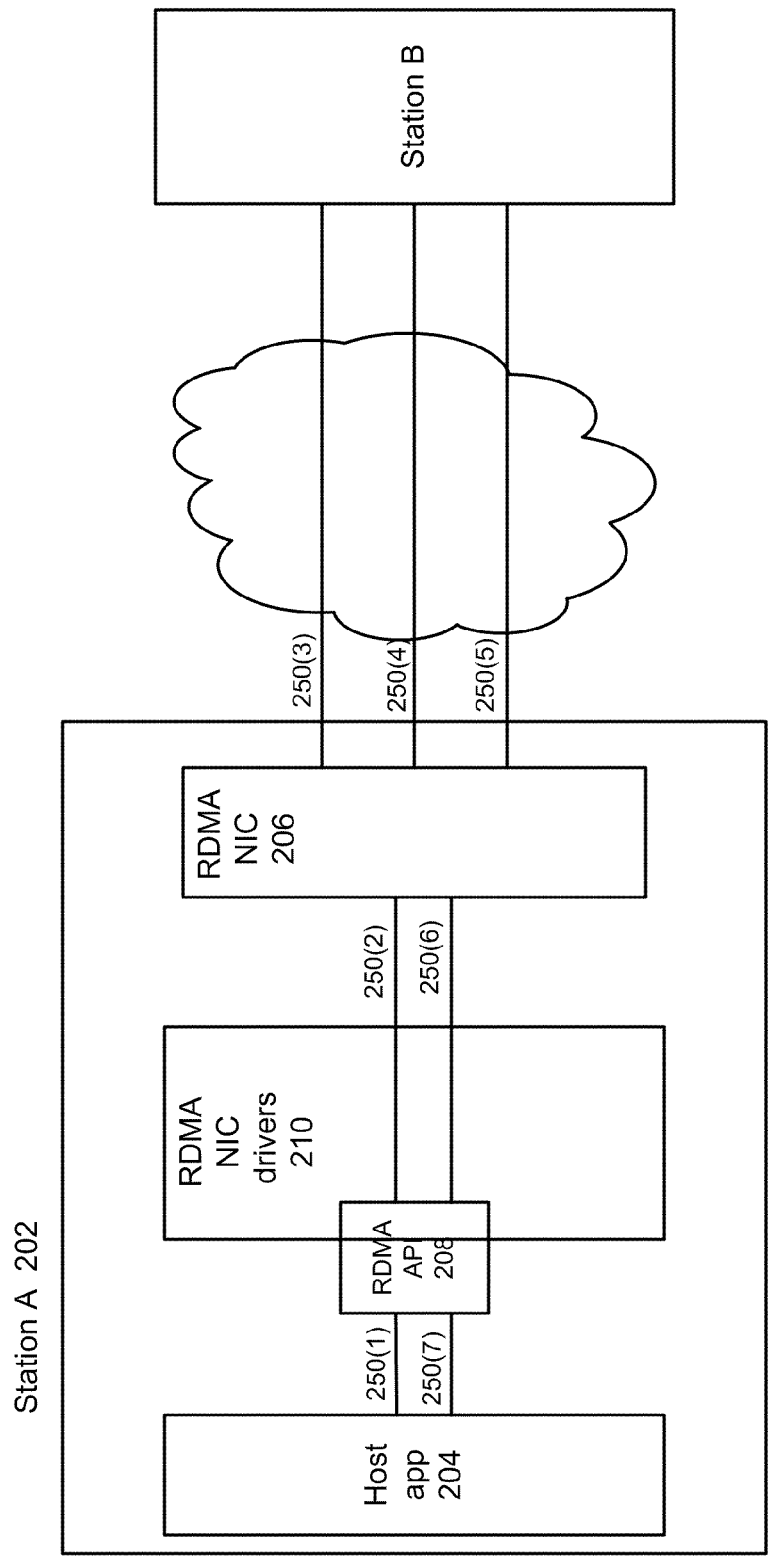
FIG. 2 is a block diagram illustrating how various RDMA WRITE completion semantics may be implemented in an RDMA NIC using generally available RDMA operations.

We now describe, with regard to the system block diagram in FIG. 2, an example of how various RDMA WRITE completion semantics may be implemented in an RDMA NIC using generally available RDMA operations. Referring to FIG. 2, Station A includes a host application, operating on a host system, that interfaces to an RDMA NIC 206 via an RDMA application program interface 208 to an RDMA NIC vendor device driver or library 210. It is noted that the host application could be a distributed application, in a cluster or in the cloud, and the application is usually considered to be the sum of the interconnected parts, e.g. 128-node cluster system with 128 interacting applications, one on each node, and another example being a on-line transaction system with the client part of the application running on a laptop and the server being located somewhere on the internet. A third example is the backup application referred to here in the examples with one half of the application running on a particular host station-A with the backup portion of the application running on station-B "across the river" connected via a computer network of some sort (first and last segment of which are Ethernet).

Thus, for example, to cause an RDMA WRITE to be performed, the host application 204 may access the RDMA API 208 to instruct that the RDMA WRITE be performed. In the example, the instruction 250(1) includes an indication of a desired RDMA WRITE completion semantic. The RDMA NIC device driver 210 receives the instruction 250(1) from the host application 204 and, based thereon, provides an instruction 250(2) to the RDMA NIC 206 to accomplish the RDMA WRITE, including to perform operations such that the RDMA NIC device driver 210 can provide the indicated desired RDMA WRITE completion semantic back to the host application 204.

In general, the instruction 250(2) includes enough information so that, in addition to causing the data transfer functions of the requested RDMA WRITE operation, the RDMA NIC 206 may interact with an RDMA NIC (or other RDMA implementation) of Station B to glean enough information such that an appropriate RDMA WRITE completion indication can be provided to the host application 204. In particular, as discussed above, the RDMA NIC 206 may use a generally available RDMA operation, such as an RDMA READ operation, to glean information regarding the completion of the RDMA WRITE. Using this information, the RDMA NIC 206 can communicate as appropriate back to the RDMA NIC drivers 210, so that an RDMA WRITE indication can be provided back to the host application 204 via the RDMA API 208.

More specifically, still referring to FIG. 2, the instruction 250(2) to the RDMA NIC may include an indication of the desired completion semantic. In the case of the indicated desired completion semantic being a source semantic, this is handled by the RDMA NIC in a conventional manner. There are at least two mechanisms available: the first is to assign an RDMA WRITE completion attribute at the Queue Pair (QP) creation time, and the other would be to set a flag in the RDMA WRITE work request that goes from the application to the RDMA NIC as to which completion semantics are requested.

In the case of the indicated desired completion semantic being a delivery and interconnect semantic, the RDMA NIC 206 issues the RDMA WRITE operation 250(3) and then issues an RDMA READ operation 250(4)—in this case, a zero byte RDMA READ operation—behind the RDMA WRITE operation 250(3). In the case of the indicated desired completion semantic being a placement semantic, the RDMA NIC READ operation 250(4) is a greater than zero byte RDMA READ operation, which is issued behind the RDMA WRITE operation 250(3).

The RDMA READ operation 250(4), whether a zero byte or greater than zero byte RDMA READ operation, results in a Read Completion 250(6) being generated by the RDMA NIC 206 based on information 250(5) returned to the RDMA NIC 206 from Station B. The generation of the information 250(5) and the generation of the Read Completion 250(6) by the RDMA NIC 206 is, in and of itself, conventional. Generally, an RDMA READ is always end-to-end (involves the remote RDMA processing) and always results in a local completion.

This RDMA READ RESPONSE can then be turned into an RDMA WRITE completion on the Station A RDMA NIC and an RDMA WRITE completion provided to Station A. In another example, the RDMA NIC device driver or library 210 is "stateful," in that the RDMA NIC driver or library 210 maintains enough state to know that the host application 204 expects an RDMA WRITE completion, and to receive the RDMA READ Completion 250(6) from the RDMA NIC 206 and complete the RDMA READ Completion 250(6) as an RDMA WRITE Completion 250(7) to the host application 204 via the RDMA API 208. It is noted, given that the RDMA NIC device driver or library 210 generates the RDMA WRITE Completion 250(7) based on the RDMA READ Completion 250(6) from the RDMA NIC 206, the RDMA NIC device driver or library 210 need not request an RDMA WRITE completion in the first place.

What is claimed is:

1. A method of operating an RDMA Network Interface Controller (NIC) to accomplish an RDMA WRITE operation initiated by an application operating on a host computing device to which the RDMA NIC is coupled for RDMA communication over a network with a peer device, comprising:
by the RDMA NIC, receiving an RDMA WRITE request from the host device, for writing data from a memory associated with the host device to a memory associated with the peer device using an RDMA protocol, wherein the RDMA WRITE request received from the RDMA NIC includes a corresponding WRITE completion semantics indication;
by the RDMA NIC, initiating an RDMA WRITE operation from the memory associated with the host device to the memory associated with the peer device; and
by the RDMA NIC, automatically generating a completion indication for the RDMA WRITE operation to the host computing device by performing an RDMA READ operation and converting a READ COMPLETION for the RDMA READ operation to the completion indication for the RDMA WRITE operation.

2. The method of claim 1, wherein:
the completion semantics indication indicating one of a group consisting of source, delivery and interconnect, and placement.

3. The method of claim 1, wherein:
performing the RDMA READ operation includes determining a parameter for the RDMA READ operation based on the WRITE completion semantics indication.

4. A method of operating an RDMA Network Interface Controller (NIC) to accomplish an RDMA WRITE operation initiated by an application operating on a host computing device to which the RDMA NIC is coupled for RDMA communication over a network with a peer device, comprising:
by the RDMA NIC, receiving an RDMA WRITE request, for writing data from a memory associated with the host device to a memory associated with the peer device using an RDMA protocol;
by the RDMA NIC, initiating an RDMA WRITE operation from the memory associated with the host device to the memory associated with the peer device; and
by the RDMA NIC, performing a generally available RDMA operation in addition to the RDMA WRITE operation and generating a completion indication for the RDMA WRITE operation to the host computing device based on a completion indication for the generally available RDMA operation, wherein performing the generally available RDMA operation includes performing an RDMA read operation as the generally available RDMA operation, and wherein performing the RDMA read operation includes configuring the RDMA READ operation such that a host application configured to use a first RDMA protocol operates properly with respect to RDMA WRITE completion semantics even if the RDMA NIC operates according to a second RDMA protocol.

5. The method of claim 4, wherein:
performing a generally available RDMA operation includes performing an RDMA READ operation.

6. The method of claim 5, wherein:
receiving the RDMA WRITE request includes receiving a corresponding WRITE completion semantics indication; and
performing the RDMA READ operation includes performing the RDMA READ operation with parameters corresponding to the received WRITE completion semantics indication.

7. The method of claim 6, wherein:
the received completion semantics indication is a delivery and remote system interconnect semantics indication; and
the generally available RDMA operation is a zero-byte RDMA READ operation.

8. The method of claim 6, wherein:
the received completion semantics indication is a delivery and remote system interconnect semantics indication; and
the generally available RDMA operation is a greater than zero-byte RDMA READ operation.

9. A method of operating an RDMA Network Interface Controller (NIC) to accomplish an RDMA WRITE operation initiated by an application operating on a host computing device to which the RDMA NIC is coupled for RDMA communication over a network with a peer device, comprising:
by the RDMA NIC, receiving an RDMA WRITE request from the host device, for writing data from a memory associated with the host device to a memory associated with the peer device using an RDMA protocol;
by the RDMA NIC, initiating an RDMA WRITE operation from the memory associated with the host device to the memory associated with the peer device; and
by the RDMA NIC, automatically generating a completion indication for the RDMA WRITE operation to the host computing device by performing an RDMA READ operation and converting a READ COMPLETION for the RDMA READ operation to the completion indication for the RDMA WRITE operation;
wherein performing the RDMA READ operation includes configuring the RDMA READ operation such that a host application configured to use a first RDMA protocol operates properly with respect to RDMA WRITE completion semantics even if the RDMA NIC operates according to a second RDMA protocol.

10. The method of claim 9, wherein:
performing the RDMA READ operation is based on a configuration that is globally settable.

* * * * *